US008439255B2

(12) United States Patent
Nakagawa

(10) Patent No.: US 8,439,255 B2
(45) Date of Patent: May 14, 2013

(54) REMOTE CODE READER SYSTEM

(75) Inventor: Katsuya Nakagawa, Kusatsu (JP)

(73) Assignee: SSD Company Limited, Shiga (JP)

( * ) Notice: Subject to any disclaimer, the term of this patent is extended or adjusted under 35 U.S.C. 154(b) by 190 days.

(21) Appl. No.: 12/840,044

(22) Filed: Jul. 20, 2010

(65) Prior Publication Data

US 2012/0125992 A1 May 24, 2012

(30) Foreign Application Priority Data

Jul. 22, 2009 (JP) ................................ 2009-170818

(51) Int. Cl.
*G06F 17/00* (2006.01)
*G06K 7/00* (2006.01)
*G06K 7/10* (2006.01)

(52) U.S. Cl.
USPC .. 235/375; 235/435; 235/462.01; 235/462.07

(58) Field of Classification Search .................. 235/375, 235/435, 462.01, 462.07
See application file for complete search history.

(56) References Cited

U.S. PATENT DOCUMENTS

| | | | | |
|---|---|---|---|---|
| 6,446,871 | B1 * | 9/2002 | Buckley et al. | 235/472.03 |
| 2006/0032901 | A1 * | 2/2006 | Sugiyama et al. | 235/375 |
| 2006/0248204 | A1 * | 11/2006 | Philyaw et al. | 709/229 |

* cited by examiner

*Primary Examiner* — Michael G Lee
*Assistant Examiner* — Laura Gudorf
(74) *Attorney, Agent, or Firm* — Jackson Patent Law Office

(57) ABSTRACT

A remote code reader system sends a code read by a code reader to an appropriate function by utilizing identification information assigned specific to a client in order to select a function. A barcode reader and a host computer connected to a network are included therein. An ID (pen ID) of the barcode reader 1 and a barcode as read are transmitted to the host computer through a terminal connected to the network. The host computer decodes the received pen ID to select a CGI which conforms to the pen ID, and sends the barcode to the CGI 9 as selected in order to make the CGI process it.

24 Claims, 10 Drawing Sheets

REMOTE CODE READER SYSTEM

BACKGROUND OF THE INVENTION

1. Field of the Invention

The present invention relates to a remote code reader system and the related arts for collecting, through a network, a code (for example, a barcode) which is read by a code reader, and processing it.

2. Description of the Related Art

Patent Document (Japanese Unexamined Patent Application Publication No. 2001-306624) discloses an information collecting system which utilizes a barcode reader. The barcode reader adds identification data for specifying the barcode reader to barcode data, and then sends it to a PC. Then, the PC transmits the data to a host computer through a communication network.

In this case, the identification data of the barcode reader is sent to the host computer together with the barcode data. Then, the host computer manages personal information of a user in association with the identification data of the barcode reader.

SUMMARY OF THE INVENTION

In this way, in general, the discrimination data of the barcode reader is utilized in order to manage the personal information of the user. However, the present inventor focused on a new usage of identification information of a client such as a barcode reader.

It is therefore an object of the present invention to provide a remote code reader system and the related arts capable of giving a code read by a code reader and/or a result of decoding the code to an appropriate function by utilizing identification information assigned specific to a client in order to select a function.

In accordance with a first aspect of the present invention, a remote code reader system comprising: a code reader operable to read a code; and a server configured to connect to a network, wherein identification information assigned specific to a client including said code reader, and the code read by said code reader are transmitted to said server through a terminal connected to the network, and wherein said server including: a decoding unit operable to decode the received identification information to select a function which conforms to the identification information; and a giving unit operable to give the code, or the code and the identification information to the function as selected in order to make the function process.

In accordance with this configuration, the identification information (e.g., identification information of the code reader, identification information of a user, identification information of the terminal, or identification information of software installed on the terminal, or a combination of two or more thereof) of the client is utilized for the selection of the function (e.g., the CGI installed on the present server, or the other server, or the CGI installed thereon), and therefore it is possible to give the code read by the code reader to the appropriate function. As the result, the appropriate function corresponding to the client is invoked, and therefore the function can perform information processing depending on the received code.

In this remote code reader system, wherein said decoding unit decodes the identification information and the code to select a function which conforms to the identification information and the code.

In accordance with a second aspect of the present invention, a remote code reader system comprising: a code reader operable to read a code; and a server configured to connect to a network, wherein identification information assigned specific to a client including said code reader, and the code read by said code reader are transmitted to said server through a terminal connected to the network, and wherein said server including: a first decoding unit operable to decode the received identification information in accordance with a first predetermined algorithm to select a function which conforms to the identification information; a second decoding unit operable to decode the received code in accordance with a second predetermined algorithm; and a giving unit operable to give at least a result of decoding by said second decoding unit among the code, the identification information, and the result of decoding to the function as selected in order to make the function process.

In accordance with this configuration, the identification information (e.g., identification information of the code reader, identification information of a user, identification information of the terminal, or identification information of software installed on the terminal, or a combination of two or more thereof) of the client is utilized for the selection of the function (e.g., the CGI installed on the present server, or the other server, or the CGI installed thereon), and therefore it is possible to give the result of decoding the code to the appropriate function. As the result, the appropriate function corresponding to the client is invoked, and therefore the function can perform information processing depending on the received result of decoding.

In this remote code reader system, wherein said first decoding unit decodes the identification information and the code in accordance with the first predetermined algorithm to select a function which conforms to the identification information and the code.

In the above remote code reader system, wherein said second decoding unit decodes the identification information and the code in accordance with the second predetermined algorithm.

In the remote code reader system according to the above first or second aspect, wherein the identification information of the client is identification information of said code reader, identification information of the terminal, identification information of a user, or identification information of software installed on the terminal, or a combination of two or more thereof.

In accordance with a third aspect of the present invention, a remote code reader system comprising: a code reader operable to read a code; and a server configured to connect to a network, wherein the code read by said code reader is transmitted to said server through a terminal connected to the network, and wherein said server including: a decoding unit operable to decode the received code to select a function which conforms to the code; and a giving unit operable to give the code to the function as selected in order to make the function process.

In accordance with this configuration, the code read by the code reader is utilized for the selection of the function (e.g., the CGI installed on the present server, or the other server, or the CGI installed thereon), and therefore it is possible to give the code to the appropriate function. As the result, the appropriate function corresponding to the code is invoked, and therefore the function can perform information processing depending on the received code.

In accordance with a fourth aspect of the present invention, a remote code reader system comprising: a code reader operable to read a code; and a server configured to connect to a network, wherein the code read by said code reader is transmitted to said server through a terminal connected to the network, and wherein said server including: a first decoding unit operable to decode the code in accordance with a first predetermined algorithm to select a function which conforms to the code; a second decoding unit operable to decode the code in accordance with a second predetermined algorithm; and a giving unit operable to give at least a result of decoding by said second decoding unit of the code and the result of decoding to the function as selected in order to make the function process.

In accordance with this configuration, the code read by the code reader is utilized for the selection of the function (e.g., the CGI installed on the present server, or the other server, or the CGI installed thereon), and therefore it is possible to give the result of decoding the code to the appropriate function. As the result, the appropriate function corresponding to the code is invoked, and therefore the function can perform information processing depending on the received result of decoding.

In the remote code reader system according to any one of the above first to fourth aspects, wherein the function is a function for providing with service dynamically.

In the remote code reader system according to any one of the above first to fourth aspects, wherein the code is a one-dimensional code, a two-dimensional code, or a code stored in an IC tag. For example, the one-dimensional code is a one-dimensional barcode, the two-dimensional code is a QR code or a code represented with a dot pattern, or the IC tag is an RFID tag.

In accordance with a fifth aspect of the present invention, a host computer is the host computer of the remote code reader system according to any one of the above first to fourth aspects.

In accordance with a sixth aspect of the present invention, a code reader is the code reader of the remote code reader system according to any one of the above first to fourth aspects.

In accordance with a seventh aspect of the present invention, a code-collection-process method comprising the steps of: receiving identification information assigned specific to a client including a code reader for reading a code, and the code read by the code reader through the code reader and a terminal-connected to a network; decoding the received identification information to select a function which conforms to the identification information; and giving the code, or the code and the identification information to the function as selected in order to make the function process.

In accordance with this configuration, the same advantage as the remote code reader system according to the above first aspect can be gotten.

In accordance with a eighth aspect of the present invention, a code-collection-process method comprising the steps of: receiving identification information assigned specific to a client including a code reader for reading a code, and the code read by the code reader through a terminal connected to a network; decoding the received identification information in accordance with a first predetermined algorithm to select a function which conforms to the identification information; decoding the received code in accordance with a second predetermined algorithm; and giving at least a result of decoding by the second predetermined algorithm among the code, the identification information, and the result of decoding to the function as selected in order to make the function process.

In accordance with this configuration, the same advantage as the remote code reader system according to the above second aspect can be gotten.

In accordance with a ninth aspect of the present invention, a code-collection-process method comprising the steps of: receiving a code read by a code reader for reading the code through the code reader and a terminal connected to a network; decoding the received code to select a function which conforms to the code; and giving the code to the function as selected in order to make the function process.

In accordance with this configuration, the same advantage as the remote code reader system according to the above third aspect can be gotten.

In accordance with a tenth aspect of the present invention, a code-collection-process method comprising the steps of: receiving a code read by a code reader for reading the code through the code reader and a terminal connected to a network; decoding the received code in accordance with a first predetermined algorithm to select a function which conforms to the code; decoding the code in accordance with a second predetermined algorithm; and giving at least a result of decoding by the second predetermined algorithm of the code and the result of decoding to the function as selected in order to make the function process.

In accordance with this configuration, the same advantage as the remote code reader system according to the above fourth aspect can be gotten.

In accordance with a eleventh aspect of the present invention, a computer program is a computer program for enabling a computer to perform the code-collection-process method according to any one of the above seventh to the tenth aspects.

In accordance with a twelfth aspect of the present invention, a recording medium is a computer readable recording medium embodying a computer program for enabling a computer to perform the code-collection-process method according to any one of the above seventh to the tenth aspects.

Incidentally, the recording mediums include, for example, a flexible disk, a hard disk, a magnetic tape, a magneto-optical disk, a CD (including CD-ROM, Video-CD), a DVD (including DVD-Video, DVD-ROM, DVD-RAM), a ROM cartridge, a RAM memory cartridge with a battery backup unit, a flash memory cartridge, a nonvolatile RAM cartridge, and so on.

BRIEF DESCRIPTION OF THE DRAWINGS

The novel features of the present invention are set forth in the appended any one of claims. The invention itself, however, as well as other features and advantages thereof, will be best understood by reference to the detailed description of specific embodiments which follows, when read in conjunction with the accompanying drawings, wherein:

DESCRIPTION OF THE PREFERRED EMBODIMENTS

In what follows, several embodiments of the present invention will be explained in detail with reference to the accompanying drawings. Meanwhile, like references indicate the same or functionally similar elements throughout the respective drawings, and therefore redundant explanation is not repeated.

Figure 1:
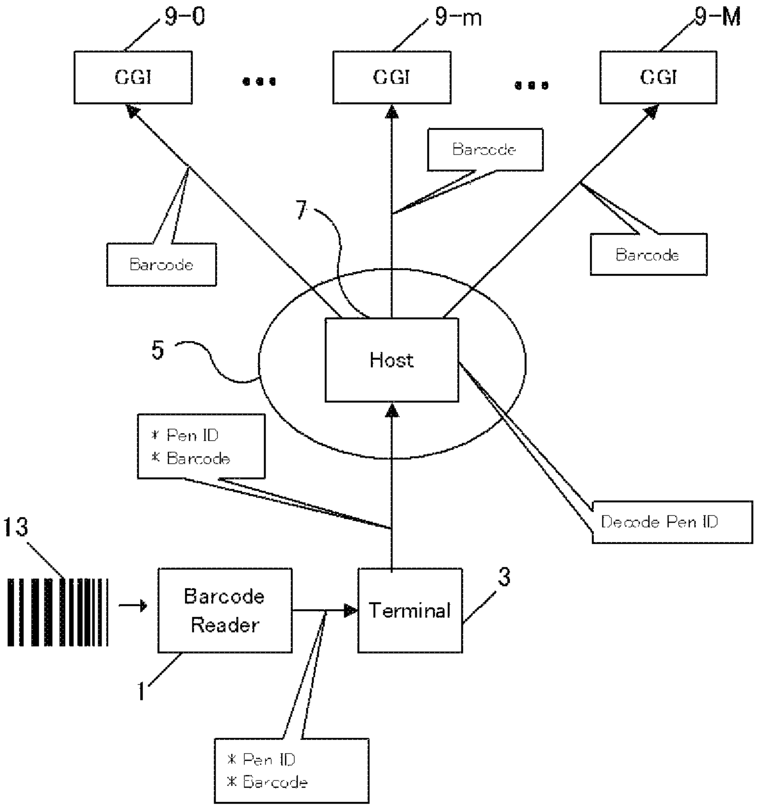
FIG. 1 is a view showing the overall configuration of a remote barcode reader system in accordance with an embodiment of the present invention.

FIG. 1 is a view showing the overall configuration of a remote barcode reader system in accordance with an embodiment of the present invention. Referring to FIG. 1, the remote barcode reader system includes a host computer 1 (may be referred to as a "center server") 7, and a plurality of barcode readers 1 (only one barcode reader 1 is shown in FIG. 1). Incidentally, these barcode readers 1 are dedicated for the present system.

In the context of this document, the term "barcode" is intended to generally represent the information contained in a barcode or the pattern of a barcode, so that when there is no need to distinguish the barcode information and the barcode pattern, the term "barcode" is simply used. From a different view point, the barcode is a code which is assigned to an article (tangible entity such as goods or estate, intangible entity such as service or information (image, sound, program, data or the like), commodity, or, human being, animal or another living being), or any other thing which can be identified by some means.

The barcode information represents a string of characters such as numerals, letters, symbols and the like. The barcode pattern is a pattern of black bars and white spacings which are combined in order to encode the barcode information. Incidentally, the barcode, the barcode information, and the barcode pattern are given the same reference numeral "13".

By the way, the barcode reader 1 scans the barcode pattern 13, and then transmits a result of decoding the barcode pattern 13, i.e., the barcode information 13, and identification information which is assigned specific to the barcode reader 1 (hereinafter referred to as "pen ID") to a terminal 3.

The terminal 3 transmits the pen ID and the barcode information 13 as received from the barcode reader 1 to the host computer 7 through a network Internet, LAN, and so on) 5.

The host computer 7 decodes the received pen ID in accordance with a predetermined algorithm to select a CGI (Common Gateway Interface) 9-*m* (m is an integer) which conforms to the pen ID. Incidentally, a value of "M" in the figure is obtained by subtracting 1 from the total number of CGIs. And, the host computer 7 sends the received barcode information 13 to the selected CGI 9-*m*. Incidentally, the CGI 9-*m* may be disposed on the network 9, or the host computer 7.

The CGI 9-*m* as received the barcode information 13 performs information processing depending on the barcode information 13. Concrete processing in this case is planned and designed arbitrarily and freely by an entity and so on running the CGI 9-*m*, and therefore the present remote barcode reader system is involved therein.

Next, the barcode reader 1 of FIG. 1 will be explained in detail in accordance with a specific example.

Figure 2A:
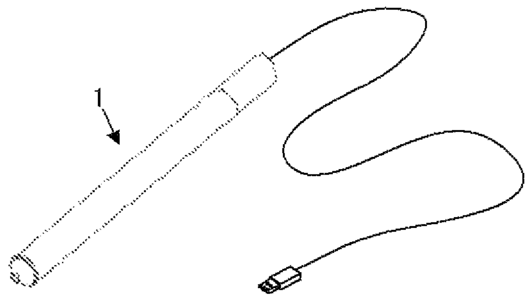
FIG. 2A is a perspective external view for showing an example of a barcode reader 1 of FIG. 1.
Figure 2B:
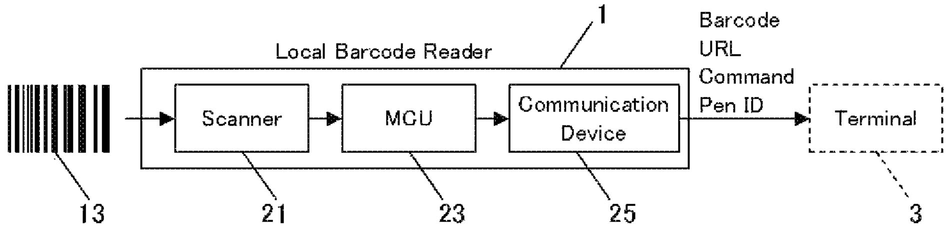
FIG. 2B is a schematic diagram for showing the electric configuration of the barcode reader 1 of FIG. 2A.
Figure 2C:
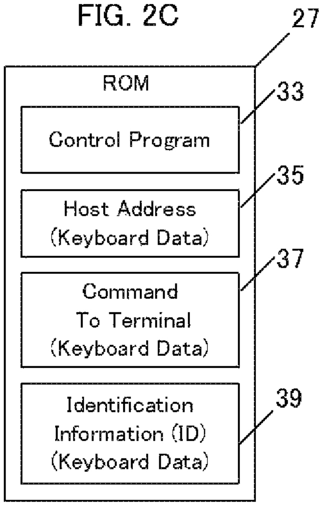
FIG. 2C is a schematic representation of programs and data stored in a ROM 27 incorporated in an MCU 23 of FIG. 2B.

FIG. 2A is a perspective external view for showing an example of the barcode reader 1 of FIG. 1. FIG. 2B is a schematic diagram for showing the electric configuration of the barcode reader 1 of FIG. 2A. FIG. 2C is a schematic representation of programs and data stored in a ROM 27 incorporated in an MCU 23 of FIG. 2B.

Referring to FIG. 2A, the barcode reader 1 is a pen type barcode reader. Referring to FIG. 2B, the barcode reader 1 includes a scanner 21, the MCU 23, and a communication device 25. The scanner 21 optically reads the barcode pattern 13, and converts (scans) bars and spacings into an electrical signal. The electrical signal corresponding to the barcode pattern 13 is given to the MCU 23 from the scanner 21.

The MCU 23 includes, as built-in elements, a CPU (not shown in the figure), a RAM (not shown in the figure), an A/D converter, the ROM 27 shown in FIG. 2C and so forth. The ROM 27 is used to store a control program 33, an address (may be referred to as an "host address") 35 of the host computer 7 in a form of keyboard data, a command 37 in the form of keyboard data to be issued to the terminal 3, identification information (pen ID) 39 in the form of keyboard data, and any other necessary programs and data. Incidentally, for example, the address 35 is a URL (Uniform Resource Locator) of the host computer 7.

The command 37 is a command which is used to instruct the terminal 3 to run a browser and access the host computer 7 by the use of the address 35. For example, in the case where an OS (Operating System) is Windows (registered trademark), the command 37 is provided as the keyboard data corresponding to a GUI (Graphical User Interface) key+"R" key of a keyboard if the OS is Windows 98 or latter version. Windows launches a browser (Internet Explorer) in response to this command 37. In other words, this command 37 is included as a default command of Windows which is an OS. Meanwhile, the GUI key of Windows is generally referred to as Windows key. Since the barcode reader 1 stores and outputs the command 37 of an OS such as Windows which is taking a significant market share, it is possible to make use of most terminals as the terminal 3 by an easy procedure, i.e., only by connecting the barcode reader 1 to the terminal 3. Because of this, the barcode reader 1 need not store a plurality of commands in advance, and recognize the OS used by each terminal 3, select and use the command corresponding to the OS, and so forth.

The pen ID is a unique code that is assigned to identify the barcode reader 1.

The MCU 23 runs the control program 33. Thereby, the MCU 23 decodes an electrical signal corresponding to the barcode pattern 13, and acquires the barcode information 13. Then, the MCU 23 sends the barcode information 13 converted into the form of the keyboard data, and the command 37, the host address 35, and the pen ID 39, which are stored in the form of the keyboard data in the ROM 27, to the communication device 25.

The communication device 25 is, for example, a USB controller or the like, and transmits data for output in the form of keyboard data (the command 37, the host address 35, the barcode information 13, and the pen ID 39), which is received from the MCU 23, to the terminal 3. Then, in response to the received command 37, the terminal 3 transmits the barcode information 13 and the pen ID 39 as received to the host computer 7 with reference to the received host address 35 through the network 5.

Figure 3:
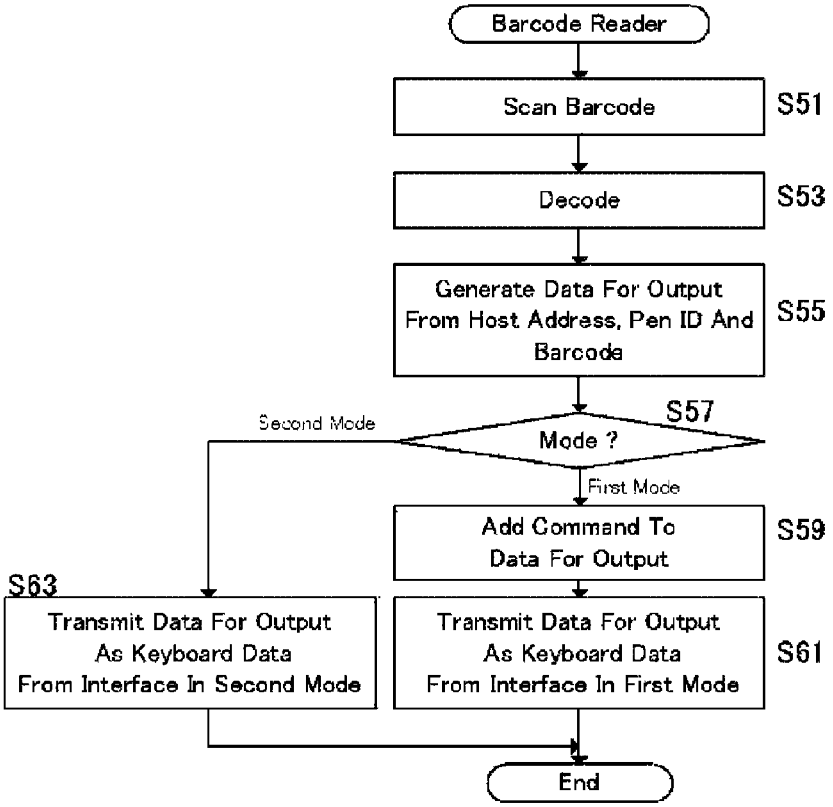
FIG. 3 is a flow chart for showing an example of the process flow of the MCU 23 of FIG. 2B.

FIG. 3 is a flow chart for showing an example of the process flow of the MCU 23 of FIG. 2B. Referring to FIG. 3, in step S51, the MCU 23 of the barcode reader 1 scans the barcode pattern 13 in response to the operation of the user. In step S53, the MCU 23 decodes the barcode pattern 13 on the basis of an well-known barcode decoding technique to acquire the barcode information 13. In step S55, the MCU 23 generates the data for output (e.g., "www.ssd.co.jp/?bc=4560256580016&sn=15555") from the barcode information 13 (e.g., "4560256580016"), the host address 35 (e.g., "www.ssd.co.jp"), and the pen ID (e.g., "15555").

In step S57, the MCU 23 confirms the current mode, proceeds to step S59 if a first mode, conversely proceeds to step S63 if a second mode. The first mode is a mode of the case where middleware for the present system is not installed on the terminal 3, or the case where it is not launched while it is installed. The second mode is a mode of the case where the middleware for the present system is installed on the terminal 3 and is launched.

Incidentally, the first mode is set to the barcode reader 1 by default. As described below, in the case where the middleware is launched in the terminal 3, the middleware switches to the second mode.

By the way, in the first mode, in step S59, the MCU 23 adds the command 37 to the data for output as generated in step S55. Then, in step S61, the MCU 23 transmits the data output to which the command 37 is added, from a first interface to the terminal 3 as keyboard data. The first interface is an interface with the terminal 3 in the first mode.

On the other hand, in the second mode, in step S63, the MCU 23 transmits the data for output as generated in Step S55, from a second interface to the terminal 3 as keyboard data. The second interface is an interface with the terminal 3 in the second mode.

Next, the processing of the terminal 3, which receives the data for output from the barcode reader 1, will be described.

Figure 4A:
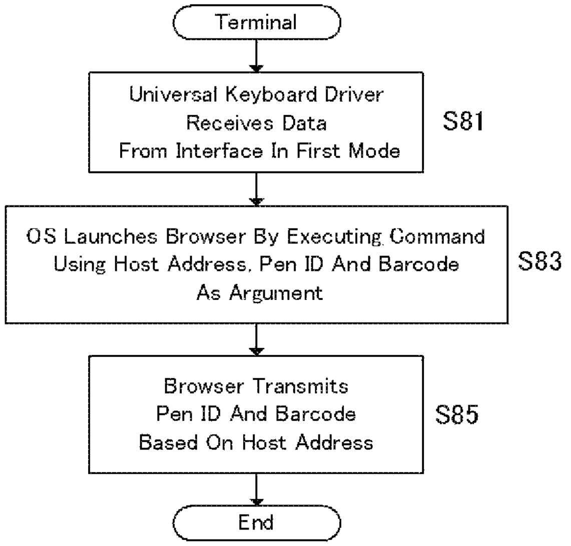
FIG. 4A is a flow chart for showing an example of the process flow of a terminal 3 which receives data from step S61 of FIG. 3.

FIG. 4A is a flowchart for showing an example of the process flow of the terminal 3 which receives data from step S61 of FIG. 3. Referring to FIG. 4A, when the MCU 23 transmits the data for output in step S61 of FIG. 3, in step S81, a universal keyboard driver of the terminal 3 receives the data for output from the interface in the first mode of the barcode reader 1. And, in step S83, an OS of the terminal 3 launches a browser of the terminal 3 by executing the command 37 included in the received data for output, using the host address 35, the pen ID 39, and the barcode 13, which are included in the received data for output, as argument. Then, in step S85, the launched browser accesses the host computer 7 by the use of the received host address 35 to transmit the pen ID 39 and the barcode 13 to the host computer 7.

Figure 4B:
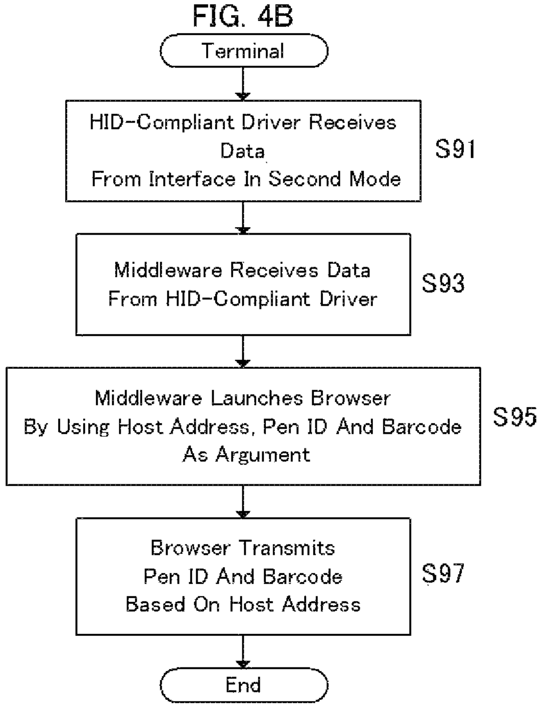
FIG. 4B is a flow chart for showing an example of the process flow of the terminal 3 which receives data from step S63 of FIG. 3.

By the way, FIG. 4B is a flow chart for showing an example of the process flow of the terminal 3 which receives data from step S63 of FIG. 3. Incidentally, it is assumed that the middleware is launched. Referring to FIG. 4B, when the MCU 23 transmits the data for output in step S63 of FIG. 3, in step S91, an HID (Human Interface Device)-compliant driver of the terminal 3 receives the data for output from the interface in the second mode of the barcode reader 1. And, in Steps S93, the middleware of the terminal 3 receives the data for output from the HID-compliant driver. In step S95, the middleware launches the browser of the terminal 3 using the host address 35, the pen ID 39, and the barcode 13, which are included in the received data for output, as argument. Then, in step S97, the launched browser accesses the host computer 7 by the use of the received host address 35 to transmit the pen ID 39 and the barcode 13 to the host computer 7.

Incidentally, in the above example, a protocol "http://" is not added to the host address 35 which the barcode reader 1 transmits, and therefore the browser of the terminal 3 adds it to the host address 35 in the processing of FIGS. 4A and 4B. Also, in FIGS. 4A and 4B, if the browser has been already launched, it is not launched.

Next, the processing of the middleware installed on the terminal 3 will be described in a little more detail.

Figure 5:
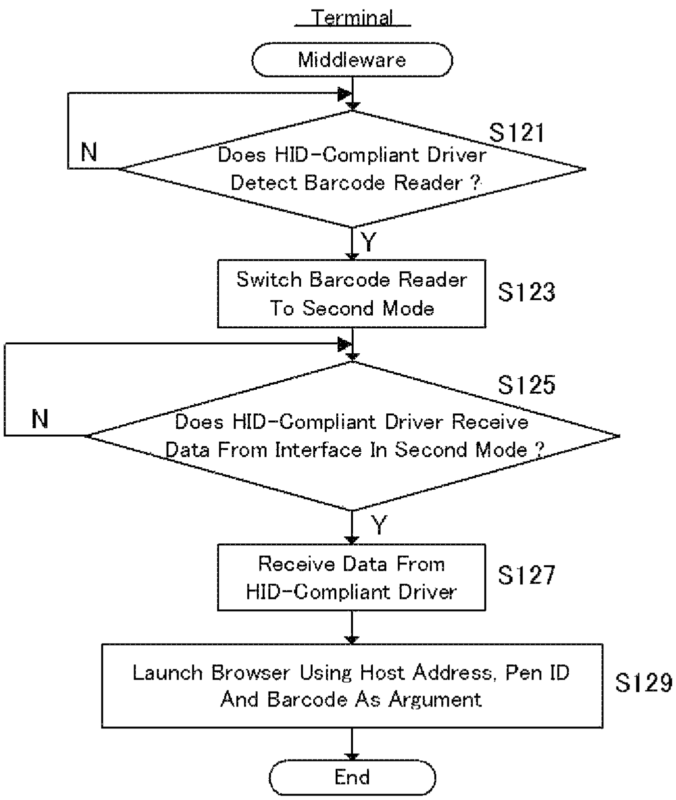
FIG. 5 is a flow chart for showing an example of the process flow of middleware installed on the terminal 3.

FIG. 5 is a flow chart for showing an example of the process flow of the middleware. Incidentally, it is assumed that the middleware is already launched. Referring to FIG. 5, when the terminal 3 is booted, in step S121, the middleware confirms whether or not the HID-compliant driver detects the barcode reader 1, the process returns to step S121 if it does not detect, conversely the process proceeds to step S123 if it detects.

In step S123, the middleware switches the mode of the barcode reader 1 to the second mode via the HID-compliant driver. Incidentally, the mode of the barcode reader 1 is set to the first mode by default. In step S125, the middleware confirms whether or not the HID compliant-driver receives data from the interface in the second mode of the barcode reader 1, the process returns to step S125 if it does not receive, conversely the process proceeds to step S127 if it receives. In step S127, the middleware receives the data received by the HID-compliant driver. Then, in step S129, the browser is launched using the host address 35, the pen ID 39, and the barcode 13, which are included in the received data, as argument. And, the process of step S97 of FIG. 4B is executed.

Incidentally, after switching to the second mode in step S123, the second mode is held, subsequently, the processes of steps S121 and S123 are not executed unless the power-off or the reboot is performed. However, when the middleware is exited, the middleware sets the barcode reader 1 to the first mode via the HID-compliant driver. And, when the middleware is launched again, the processing of FIG. 5 is executed.

Next, the host computer 7 of FIG. 1 will be explained in detail in accordance with a specific example.

Figure 6A:
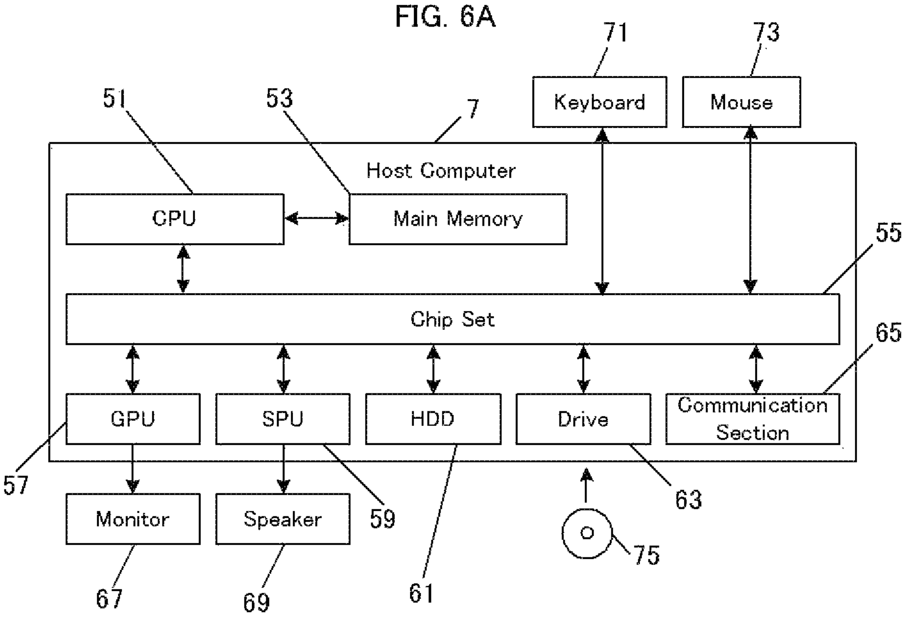
FIG. 6A is a schematic diagram for showing the electric configuration of a host computer 7 of FIG. 1.
Figure 6B:
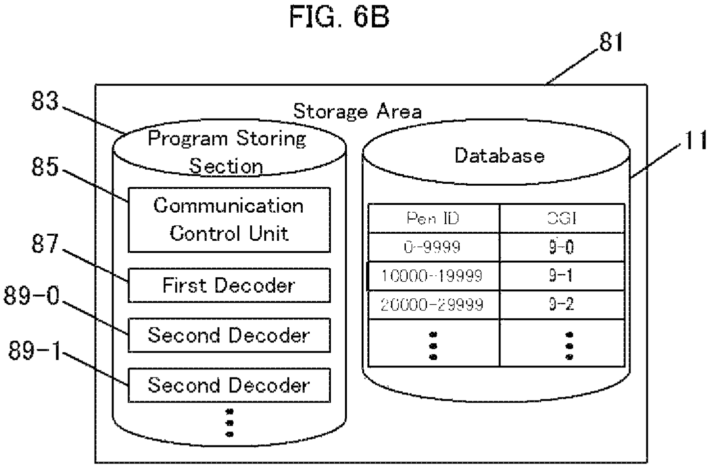
FIG. 6B is a schematic representation of the configuration of a storage area 81 of the host computer 7 of FIG. 1.

FIG. 6A is a schematic diagram for showing the electric configuration of the host computer 7 of FIG. 1. FIG. 6B is a schematic representation of the configuration of a storage area 81 of the host computer 7 of FIG. 1.

Referring to FIG. 6A, the host computer 7 is provided with a CPU (Central Processing Unit) 51, a main memory 53, a chip set 55, a GPU (Graphics Processing Unit) 57, an SPU (Sound Processing Unit) 59, an HDD (Hard Disk Drive) 61, a drive 63, and a communication section 65.

The CPU 51 performs various operations by executing computer programs stored in the HDD 61. The main memory 53 is a high speed memory capable of reading and writing directly by the CPU 51. The GPU 57 performs graphics processing to supply a monitor 67 with a video signal. The SPU 59 performs sound processing to supply a speaker 69 with an audio signal. The HDD 61 is an auxiliary storage device for storing computer programs such as OS and application software, and data to be processed by them. The drive 63 reads data from a removable recording medium 75 and writes data therein. The communication section 65 includes a LAN card, a USB controller, and so on (not shown in the figure) serving to make a connection with the network 9, and whereby controls the communication.

Such functional units as the CPU 51, the GPU 57, the SPU 59, the HDD 61, the drive 63, the communication section 65, the keyboard 71, and the mouse 73 are connected to the chip set 55. The chip set 55 manages data transfer between the functional units connected thereto.

Incidentally, the electric configuration of the terminal 3 of FIG. 1 is the same as that of the host computer 7 shown in FIG. 9A, and therefore the description thereof is omitted.

By the way, referring to FIG. 6B, the storage area 81 of the HDD 61 of the host computer 7 includes a program storing section 83 and a database 11.

The database 11 relates the CGIs to the pen IDs, and can read out the CGI related to the pen ID on the basis of the pen ID. For example, the database 11 is built by preliminarily establishing the CGIs 9-*m* which are assigned to the respective barcode readers 1, and then the barcode readers 1 are distributed or soled. Also, for example, the user selects the desired CGI 9-*m* from a predetermined website provided by the host computer 7, at the time of the first access through the terminal 3, and then the pen ID from the terminal 3 and the CGI 9-*m* selected by the user are registered in the database 11.

The program storing section 83 includes a communication control unit 85, a first decoder 87, and second decoders 89-0, . . . , 89-*m*, . . . , 89-M. The second decoders 89-0, . . . , 89-*m*, . . . , 89-M are invoked corresponding to the CGIs 9-0, . . . , 9-*m*, . . . , 9-M respectively.

These function units are implemented as programs of computer software, or subroutines of a program installed in the HDD 61. These programs are stored in the removable recording medium 75, and installed on the host computer 7 therefrom. These function units will be explained by the use of the following flow chart.

Figure 7:
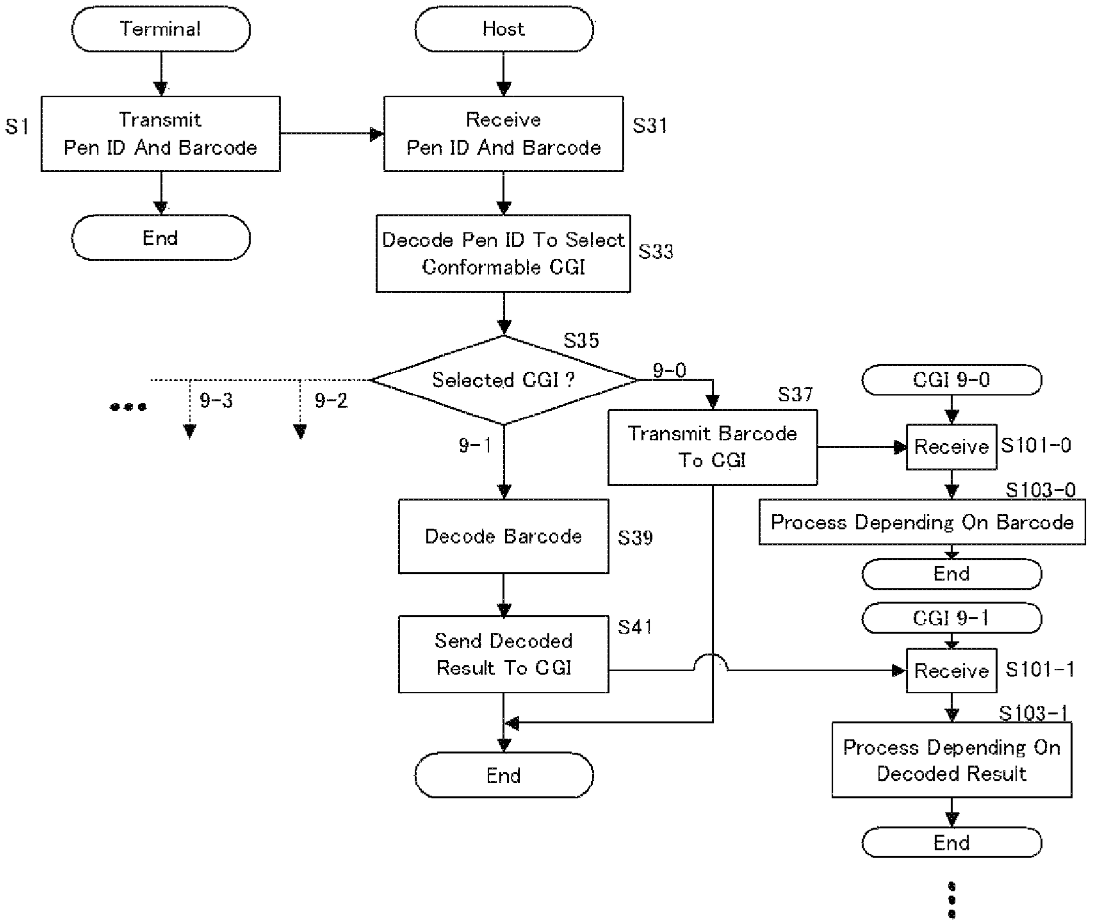
FIG. 7 is a schematic diagram for showing an example of the communication procedure among the terminal 3, the host computer 7, and a CGI 9-*m* as illustrated in FIG. 1.

FIG. 7 is a schematic diagram for showing an example of the communication procedure among the terminal 3, the host computer 7, and the CGI 9-*m* as illustrated in FIG. 1. Referring to FIG. 7, in step S1, the terminal 3 transmits the pen ID and the barcode 13 as received from the barcode reader 1 to the host computer 7 (refer to FIGS. 4A and 4B for details).

Then, in step S31, the communication control unit 85 of the host computer 7 receives the barcode 13 and the pen ID 39. And, in step S33, the first decoder 87 of the host computer 7 decodes the pen ID 39 in accordance with first predetermined algorithm (algorithm for searching the database 11 on the basis of the pen ID 39 in the present embodiment) to select the CGI 9-*m* which conforms to the barcode reader 1. In other words, the first decoder 87 searching the database 11 by the received pen ID 39 so as to acquire information of the CGI 9-*m* associated with the pen ID 39.

In step S35, the first decoder 87 transfers the received barcode 13 to the second decoder 89-*m* corresponding to the selected CGI-m. Then, the second decoder 89-*m* performs processing in accordance with second predetermined algorithm corresponding to the selected CGI 9-*m*.

For example, if the selected CGI is the CGI 9-0, in step S35, the first decoder 87 transfers the barcode 13 to the second decoder 89-0. Then, in step S37, the second decoder 89-0 transmits the received barcode 13 as it is to the selected CGI 9-0 through the communication control section 85. In this case, the second predetermined algorithm is algorithm for transmitting the barcode as it is to the CGI 9-0.

Then, in step S101-0, the CGI 9-0 receives the barcode 13 from the communication control section 85. Then, in step S103-0, the CGI 9-0 performs processing depending on the barcode 13.

Also, for example, if the selected CGI is the CGI 9-1, in step S35, the first decoder 87 transfers the barcode 13 to, the second decoder 89-1. Then, in step S39, the second decoder 89-1 decodes the received barcode 13 in accordance with the second predetermined algorithm corresponding to the CGI 9-1. In this case, the second predetermined algorithm is designed or provided depending on the corresponding CGI 9-1. And, in step S41, the second decoder 89-1 transmits a result of decoding the barcode 13 to the CGI 9-1 through the communication control section 85.

Then, in step S101-1, the CGI 9-1 receives the result of decoding the barcode 13 from the communication control section 85. Then, in step S103-1, the CGI 9-1 performs processing depending on the result of decoding the barcode 13.

Incidentally, Concrete processing of each CGI 9-*m* is planned and designed arbitrarily and freely by an entity and so on running the each CGI 9-*m*, and therefore the present remote barcode reader system is involved therein.

By the way, as described above, in accordance with the present embodiment, the pen ID is utilized for the selection of the CGI 9-*m*, and therefore it is possible to send the barcode 13 read by the barcode reader 1 and/or the result of decoding the barcode 13 to the appropriate CGI 9-*m*. As the result, the appropriate CGI 9-*m* corresponding to the barcode reader 1 is invoked, and therefore the CGI 9-*m* can perform information processing depending on the received barcode 13 and/or the received result of decoding the barcode 13.

[First Modification]

The above embodiment cites the example where the middleware is installed on the terminal 3. In contrast, in the first modification of the present embodiment, a plugin for the remote code reader system according to the first modification is added to the browser of the terminal 3 without installing the above middleware. That is, the above embodiment and the first modification differ from each other in the program which mediates between the barcode reader 1 and the browser. The other points are similar to the above embodiment. Accordingly, FIGS. 1 and 7 can be also applied to the first modification in a similar manner. Also, the hardware configurations of the terminal 3 and the host computer 7 according to the first modification are the same as that of FIGS. 6A and 6B. The hardware configuration of the barcode reader 1 according to the first modification is the same as that of FIGS. 2A and 2B. In what follows, the different points will be mainly described. Incidentally, the plugin is delivered from a removable recording medium such as a CD-ROM, a server on the network 5, and so on.

Processing of the barcode reader 1 according to the first modification is similar to the processing shown in FIG. 3. However, in the first modification, the first mode of the barcode reader 1 is a mode of the case where the plugin for the present system is not added to the browser of the terminal 3, the case where the browser to which the plugin is added is not launched, or the case where the browser is inactive (in a background) while the browser to which the plugin is added is launched. Also, the second mode is a mode of the case where the plugin for the present system is added to the browser of the terminal 3, furthermore the browser is launched, and still furthermore the browser is active (in a foreground).

Also, processing of the terminal 3 in the first mode of the barcode reader 1 according to the first modification is the same as the processing shown in FIG. 4A.

Next, processing of the terminal 3 in the second mode of the barcode reader 1 according to the first modification will be described.

Figure 8A:
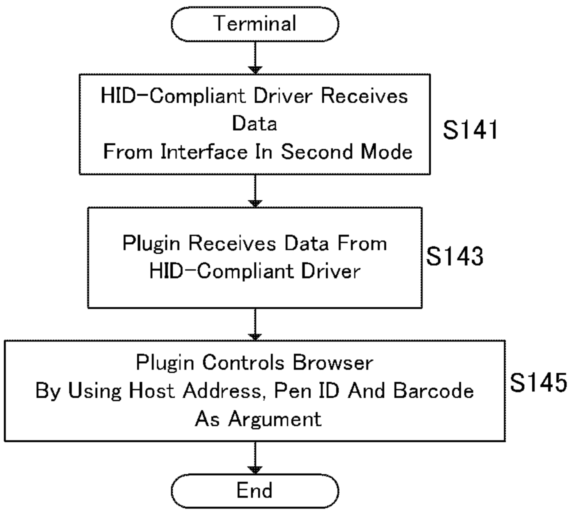
FIG. 8A is a flow chart for showing an example of the process flow of the terminal 3 in a second mode of a barcode reader 1 according to a first modification of the embodiment of the present invention.

FIG. 8A is a flow chart for showing an example of the process flow of the terminal 3 in the second mode of the barcode reader 1 according to the first modification of the embodiment of the present invention. Referring to FIG. 8A, when the MCU 23 transmits the data for output in step S63 of FIG. 3, in step S141, the HID-compliant driver of the terminal 3 receives the data for output from the interface in the second mode of the barcode reader 1. And, in step S143, the plugin added to the browser of the terminal 3 receives the data for output from, the HID-compliant driver.

And, in step S145, the plugin controls the browser using the host address 35, the pen ID 39, and the barcode 13, which are included in the received data for output, as argument.

For example, the plugin instructs the browser to access the host computer 7 indicated by the host address 35 in order to transmit the pen ID and the barcode 13 to the host computer 7. The subsequent processing of the host computer 7 and the CGI 9-*m* is similar to that of FIG. 7.

Also, for example, the plugin transfers the pen ID 39 and/or the barcode 13 to the browser, and instructs the browser to perform processing locally (in the terminal 3) using the pen ID and/or the barcode 13. In this case, for example, the browser performs the processing depending on the pen ID 39 and/or the barcode 13 by executing its own function, script such as Java (registered trademark) Script, Java (registered trademark) applet, or a plugin such as Flash (registered trademark) player.

Next, the processing of the plugin added to the browser will be described in a little more detail.

Figure 8B:
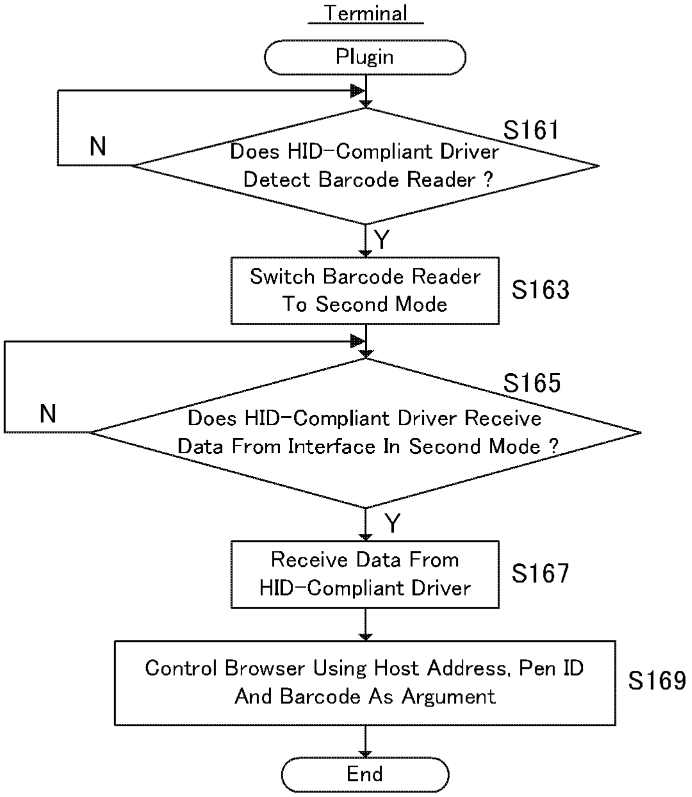
FIG. 8B is a flow chart for showing an example of the process flow of a plugin of a browser of the terminal 3 in the second mode of the barcode reader 1 according to the first modification.

FIG. 8B is a flow chart for showing an example of the process flow of the plugin in the second mode according to the first modification. Incidentally, it is assumed that the browser is in an inactive state. Referring to FIG. 8B, in step S161, the plugin confirms whether or not the HID-compliant driver detects the barcode reader 1, the process returns to step S161 if it does not detect, conversely the process proceeds to step S163 if it detects.

In step S163, the plugin switches the mode of the barcode reader 1 to the second mode via the HID-compliant driver. Incidentally, the first mode is set to the barcode reader 1 by, default. In step S165, the plugin confirms whether or not the HID-compliant driver receives data from the interface in the second mode of the barcode reader 1, the process returns to step S165 if it does not receive, conversely the process proceeds to step S167 if it receives. In step S167, the plugin receives the data as received by the HID-compliant driver. Then, in step S169, the plugin controls the browser using the host address 35, the pen ID 39, and the barcode 13, which are included in the received data, as argument.

Incidentally, after switching to the second mode in step S163, the second mode is held, subsequently, the processes of steps S161 and S163 are not executed unless the power-off or the reboot is performed. However, when the browser is exited or becomes inactive, the plugin sets the barcode reader 1 to the first mode via the HID-compliant driver. And, when the browser becomes active again, the processing of FIG. 8B is executed.

As the above result, the first modification has the advantage similar to the above embodiment.

[Second Modification]

In the second modification according to the present embodiment, the above middleware is installed on the terminal 3, and moreover the above plugin is added to the browser of the terminal 3. Accordingly, contention may occur in acquiring data from the barcode reader 1, and therefore either-or is enabled. In the second modification, control therefor is required. The other points are similar to the above embodiment. Accordingly, FIGS. 1 and 7 can be also applied to the second modification in a similar manner. Also, the hardware configurations of the terminal 3 and the host computer 7 according to the second modification are the same as that of FIGS. 6A and 6B. The hardware configuration of the barcode reader 1 according to the second modification is the same as that of FIGS. 2A and 2B. In what follows, the different points will be mainly described.

Processing of the barcode reader 1 according to the second modification is similar to the processing shown in FIG. 3. However, in the second modification, the first mode and the second mode of the barcode reader 1 are as follows. Several states will be defined before explaining the modes. A first state is a state in which the middleware for the present system is not installed on the browser of the terminal 3. A second state is a state in which the middleware is not launched while the middleware is installed on the terminal 3. A third state is a state in which the plugin is not added to the browser. A fourth state is a state in which the browser to which the plugin is added is not launched.

Under these definitions, the first mode indicates the case of the first state and the third state, the case of the first state and the fourth state, the case of the second state and the third state, or the case of the second state and the fourth state.

Also, the second mode is a mode of the case where the middleware is installed on the terminal 3 and is launched, or the case where the browser to which the plugin is added is launched, and moreover the browser is active.

Also, processing of the terminal 3 in the first mode of the barcode reader 1 according to the second modification is the same as the processing shown in FIG. 4A.

Next, processing of the terminal 3 in the second mode of the barcode reader 1 according to the second modification will be described. In this case, either the middleware or the plugin of the terminal 3 is enabled (as described below for details). Accordingly, when the middleware is enabled, processing of the terminal 3 in the second mode is the same as that of FIGS. 4B and 5. On the other hand, when the plugin is enabled, processing of the terminal 3 in the second mode is the same as that of FIGS. 8A and 8B.

Next, in the case where the middleware and the plugin contend with each other in the second mode, the control therefor will, be described.

Figure 9:
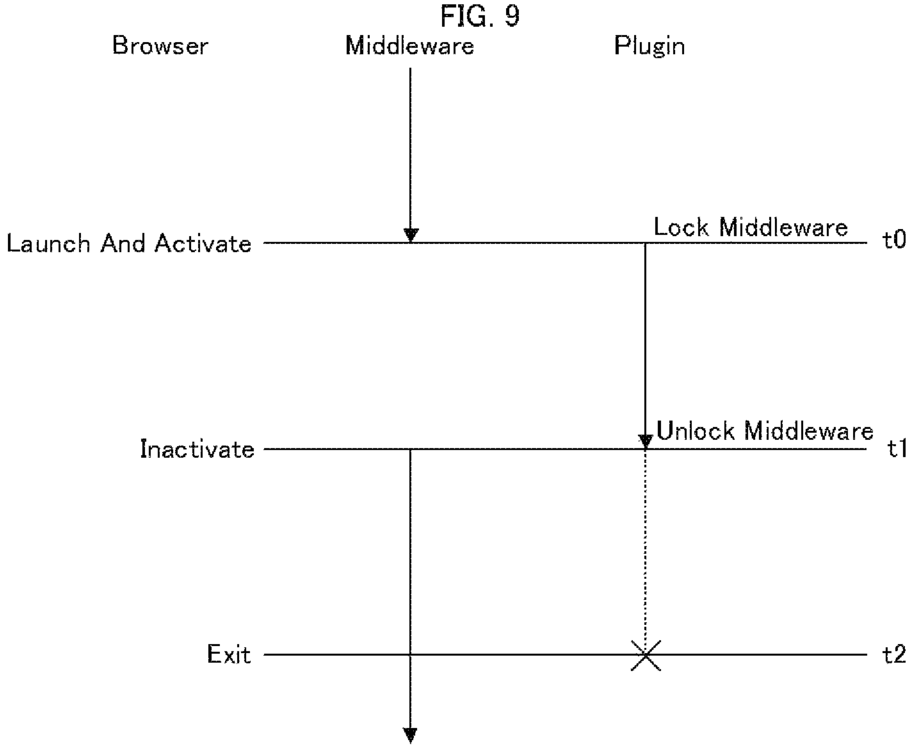
FIG. 9 is an explanatory view for showing control in a case where contention occurs in acquiring data from a barcode reader 1 according to a second modification of the embodiment, of the present invention.

FIG. 9 is an explanatory view for showing control in the case where contention occurs in acquiring data from the barcode reader 1 according to the second modification of the embodiment of the present invention. Incidentally, it is assumed that the middleware is launched. Referring to FIG. 9, before a time t0, the browser is not launched, or the browser is inactive (in a background) while the browser is launched. In this case, in the second mode, the middleware becomes active (is enabled) and performs the above process.

Then, at the time t0, it is assumed that the browser is launched and becomes active (is in a foreground). In this case, the plugin added to the browser also becomes active (is enabled) and performs the above process. However, at the point of the time, the middleware is also enabled, and therefore it needs to avoid the contention. Hence, when the plugin becomes active, the plugin locks the middleware by Mutex mechanism. As the result, the middleware becomes inactive.

Further, at a time t1, when the browser becomes inactive while the browser is launched, the plugin unlocks (releases) the middleware by Mutex mechanism and becomes inactive. As the result, the middleware becomes active and performs the above process.

And, further, at a time t2, when the browser is exited, simultaneously, the plugin is also exited. However, since the middleware remains in the unlocked state, the middleware continuously performs the above process before the browser is launched and becomes active.

Incidentally, Mutex means mutual exclusion.

By the way, if the middleware is not launched in inactivating or exiting the browser to which the plugin is added (e.g., the time t0 or t1), the plugin sets the barcode reader 1 to the first mode via the HID-compliant driver. On the other hand, if the browser to which the plugin is added is inactive or is not launched in exiting the middleware, the middleware sets the barcode reader 1 to the first mode via the HID-compliant driver.

As the above result, the second modification has the advantage similar to the above embodiment.

[Third Modification]

Referring to FIG. 1, the outline of the third modification according to the embodiment will be described. The barcode reader 1 scans the barcode pattern 13, and then transmits the barcode information 13 and the pen ID (option) to the terminal 3. The terminal 3 transmits information for identifying the terminal 3 (hereinafter referred to as "terminal ID"), and the pen ID (option) and the barcode information 13 as received from the barcode reader 1 to the host computer 7 through the network 5. Incidentally, the terminal ID is information which is used when the host computer 7 identifies the terminal 3.

The host computer 7 decodes the received terminal ID in accordance with a predetermined algorithm to select the CGI 9-*m* which conforms to the terminal ID. And, the host computer 7 transmits the received barcode information 13 to the selected CGI 9-*m*.

The CGI 9-*m* as received the barcode information 13 performs information processing depending on the barcode information 13. Concrete processing in this case is planned and designed arbitrarily and freely by an entity and so on running the CGI 9-*m*, and therefore the present remote barcode reader system is involved therein.

In what follows, the different points from the above embodiment will be mainly described.

It is assumed that the barcode reader 1 according to the third modification does not have the first mode of the above embodiment, and moreover is fixedly set to the second mode, and the above middleware is installed on the terminal 3.

Also, the hardware configuration of the terminal 3 according to the third modification is the same as that of FIG. 6A. Also, the hardware configuration of the barcode reader 1 according to the third modification is the same as that of FIG. 2A. However, the command 37 is not stored in the ROM 27. Also, the pen ID may be stored in the ROM 27, or may not be stored therein, and therefore it is optional.

Processing of the barcode reader 1 according to the third modification is similar to the processing shown in FIG. 3. However, since the barcode reader 1 has only the second mode, the steps S57, S59, and S61 are not performed, and the step S63 is performed after step S55.

Next, processing of the terminal 3 according to the third modification will be described.

Figure 10:
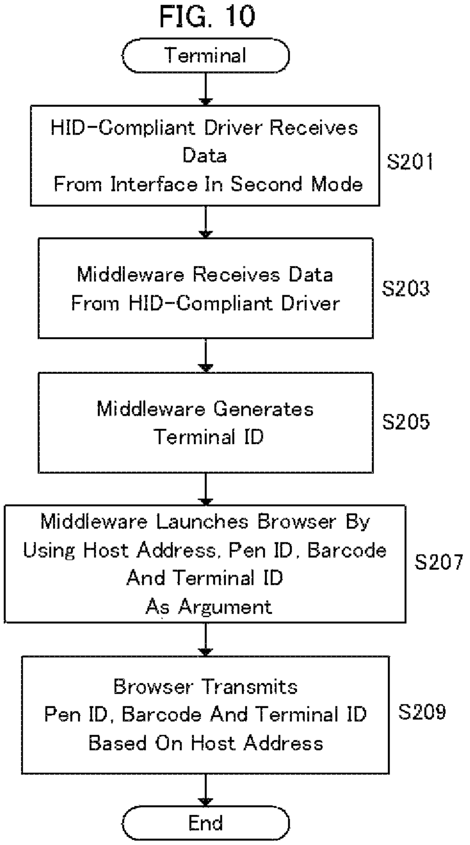
FIG. 10 is a flow chart for showing an example of the process flow of a terminal 3 according to a third modification of the embodiment of the present invention.

FIG. 10 is a flow chart for showing an example of the process flow of the terminal 3 according to the third modification of the embodiment of the present invention. Referring to FIG. 10, processes in steps S201 and S203 are similar to the processes in step S91 and S93 of FIG. 4B respectively, and therefore the description thereof is omitted. By the way, in step S205, the middleware generates the terminal ID. Specifically, the middleware sets the terminal ID to information relating to a predetermined single hardware element constituting the terminal 3, or generates the terminal ID by collecting information relating to a plurality of predetermined hardware elements constituting the terminal 3, and combining them.

For example, the information relating to the hardware element is product ID and/or a serial number of a display adapter, product ID and/or a serial number of a SCSI adapter, product ID and/or a serial number of an IDE adapter (IDE controller), a MAC address of a LAN adapter, a size of a main memory, a type of a CPU, a serial number of a CPU, a type of a HDD, a serial number of a HDD, or a type of a CD-ROM, a CD-R, a DVD-ROM, or the like.

By the way, in step S207, the middleware launches the browser of the terminal 3 by using the host address 35, the pen ID 39 (if it is included), and the barcode 13, which are included in the received data for output, and the terminal ID, as argument. Then, in step S209, the launched browser accesses the host computer 7 by the use of the received host address 35 to transmit the pen ID 39 (if it is included), the barcode 13, and the terminal ID to the host computer 7.

Next, a configuration and processing of the host computer 7 will be described. The hardware configuration of the host computer 7 according to the third modification is similar to that of FIGS. 6A and 6B. However, the database 11 relates the CGIs 9-*m* to the terminal IDs. For example, the user selects the desired CGI 9-*m* from a predetermined website provided by the host computer 7, at the time of the first access through the terminal 3, and then the terminal ID from the terminal 3 and the CGI 9-*m* selected by the user are registered in the database 11.

Also, for example, the user selects the desired CGI 9-*m* from a predetermined website provided by the host computer 7, at the time of the first access through the terminal 3, further the host computer 7 generates the terminal ID, then the terminal ID generated by the host computer 7 and the CGI 9-*m* selected by the user are registered in the database 11, and the terminal ID is transmitted to the middleware of the terminal 3. Also, for example, the database 11 is built by preliminarily establishing the CGIs 9-*m* each of which is assigned to the each middleware, and relating the each CGI 9-*m* to the identification information of the each middleware, and then the middleware is distributed and soled. In this case, the identification information of the middleware is used as the terminal ID. Incidentally, the identification information of the middleware is acquired from the host computer 7 through the network 5, or is preliminarily held in the middleware. Also, in these examples, in the following fourth modification, the middleware is replaced with the plugin.

The communication procedure among the terminal 3, the host computer 7, and the CGI 9-*m* according to the third modification can be described by replacing the "pen ID 39" with the "terminal ID" in the description of FIG. 7.

That is, in step S1, the terminal 3 transmits the pen ID (option) and the barcode 13 as received from the barcode reader 1, and the terminal ID to the host computer 7.

Then, in step S31, the communication control unit 85 of the host computer 7 receives the barcode 13 and the pen ID 39 (option), and the terminal ID. And, in step S33, the first decoder 87 of the host computer 7 decodes the terminal ID in accordance with first predetermined algorithm (algorithm for searching the database 11 by the terminal ID in the present embodiment) to select the CGI 9-*m* which conforms to the barcode reader 1. In other words, the first decoder 87 searching the database 11 by the received terminal ID so as to acquire information of the CGI 9-*m* associated with the terminal ID.

In step S35, the first decoder 87 transfers the received barcode 13 to the second decoder 89-*m* corresponding to the selected. CGI 9-*m*. Then, the second decoder 89-*m* performs processing in accordance with second predetermined algorithm corresponding to the selected CGI 9-*m*. Processing of the second decoder 89-*m* and processing of the CGI 9-*m* according to the third modification are the same as those of the above embodiment.

By the way, as described above, in accordance with the third modification according to the present embodiment, the terminal ID is utilized for the selection of the CGI 9-*m*, and therefore it is possible to send the barcode 13 read by the barcode reader 1 and/or the result of decoding the barcode 13 to the appropriate CGI 9-*m*. As the result, the appropriate CGI 9-*m* corresponding to the terminal 3 is invoked, and therefore the CGI 9-*m* can perform information processing depending on the received barcode 13 and/or the received result of decoding the barcode 13.

[Fourth Modification]

In the fourth modification according to the embodiment of the present invention, the plugin added to the browser performs the processing of the middleware according to the third modification. Accordingly, the fourth modification differs from the third modification in a processing subject. In what follows, the different points will be mainly described.

Figure 11:
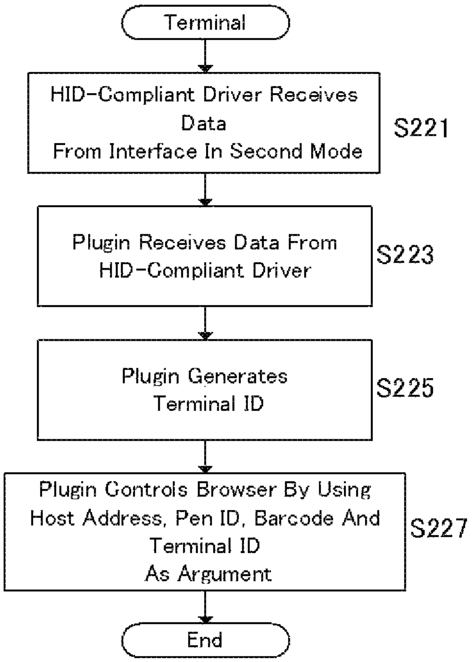
FIG. 11 is a flow chart for showing an example of the process flow of a terminal 3 according to a fourth modification of the embodiment of the present invention.

FIG. 11 is a flow chart for showing an example of the process flow of the terminal 3 according to the fourth modification of the embodiment of the present invention. Referring to FIG. 11, processes in steps S221 and S223 are similar to the processes in step S141 and S143 of FIG. 8A respectively, and therefore the description thereof is omitted. By the way, in step S225, the plugin generates the terminal ID. The generating method is the same as that of step S205 of FIG. 10. In step S227, the plugin controls the browser of the terminal 3 by using the host address 35, the pen ID 39 (if it is included), and the barcode 13, which are included in the received data for output, and the terminal ID, as argument. In this case, examples of the control of the browser are the same as ones cited in step S145 of FIG. 8A. However, in the fourth modification, in addition to the pen ID 39 (option) and, the barcode 13, the terminal ID is utilized. Incidentally, in the case where the control for transmitting them to the host computer 7 is performed, the processing of the host computer 7 and the CGI 9-*m* is similar to that of the third modification.

As the above result, the fourth modification has the advantage similar to the above third modification.

[Fifth Modification]

In the fifth modification according to the embodiment of the present invention, the middleware according to the third modification is installed on the terminal 3, and the plugin according to the fourth modification is added to the browser of the terminal 3. Accordingly, a process of the middleware and a process of the plugin according to the fifth modification are similar to the process of the middleware according to the third modification and the process of the plugin according to the fourth modification respectively.

However, like the above second modification, the problem of the contention occurs, and therefore the contention is avoided by the same means as the above second modification.

As the above result, the fifth modification has the advantage similar to the above third modification.

[Sixth Modification]

In the sixth modification according to the embodiment of the present invention, information for identifying a user (hereinafter referred to as "user ID") is utilized in place of the terminal ID of the above third modification. Accordingly, in the sixth modification, in step S205 of FIG. 10, the middleware acquires the user ID from an HDD. And, in step S207, the middleware launches the browser of the terminal 3 by using the host address 35, the pen ID 39 (if it is included), and the barcode 13, which are included in the received data for output, and the user ID, as argument. Then, in step S209, the launched browser accesses the host computer 7 by the use of the received host address 35 to transmit the pen ID 39 (if it is included), the barcode 13, and the user ID to the host computer 7.

Also, in the sixth modification, the database 11 of FIG. 6B relates the CGIs 9-*m* to the user IDs. For example, the user selects the desired CGI 9-*m* from a predetermined website provided by the host computer 7, at the time of the first access through the terminal 3, and then the user ID and the CGI 9-*m* selected by the user are registered in the database 11. In this case, for example, the user may input the user ID to the terminal 3 to send it to the host computer 7, or the host computer 7 may generate the user ID. And, the host computer 7 sends the user ID to the middleware (the plugin in the following seventh modification) of the terminal 3.

Also, for example, the database 11 is built by preliminarily establishing the CGIs 9-*m* each of which is assigned to the each middleware, and relating the each CGI 9-*m* to the identification information of the each middleware, and then the middleware is distributed and soled. In this case, the identification information of the middleware is used as the user ID. Incidentally, the identification information of the middleware is acquired from the host computer 7 through the network 5, or is preliminarily held in the middleware. Also, in this example, in the following seventh modification, the middleware is replaced with the plugin.

By the way, the communication procedure among the terminal 3, the host computer 7, and the CGI 9-*m* according to the sixth modification can be described by replacing the "terminal ID" with the "user ID" in the description of FIG. 7 of the third modification.

By the way, as described above, in accordance with the sixth modification according to the present embodiment, the user ID is utilized for the selection of the CGI 9-*m*, and therefore it is possible to send the barcode 13 read by the barcode reader 1 and/or the result of decoding the barcode 13 to the appropriate CGI 9-*m*. As the result, the appropriate CGI 9-*m* corresponding to the user ID is invoked, and therefore the CGI 9-*m* can perform information processing depending on the received barcode 13 and/or the received result of decoding the barcode 13.

[Seventh Modification]

In the seventh modification according to the embodiment of the present invention, the user ID is utilized in place of the terminal ID of the above fourth, modification. Accordingly, in the seventh modification, in step S225 of FIG. 11, the plugin acquires the user ID from an HDD. And, in step S227, the plugin controls the browser of the terminal 3 by using the host address 35, the pen ID 39 (if it is included), and the barcode 13, which are included in the received data for output, and the user ID, as argument. In this case, examples of the control of the browser are the same as ones cited in step S145 of FIG. 8A. However, in the seventh modification, in addition to the pen ID 39 (option) and the barcode 13, the user ID is utilized. Incidentally, in the case where the control for transmitting them to the host computer 7 is performed, the processing of the host computer 7 and the CGI 9-*m* is similar to that of the sixth modification. Also, examples of input of the user ID are the same as those of the sixth modification.

As the above result, the seventh modification has the advantage similar to the above sixth modification.

[Eighth Modification]

In the eighth modification according to the embodiment of the present invention, the user. ID is utilized in place of the terminal ID of the above fifth modification. Accordingly, in the eighth modification, the middleware of the sixth modification is installed on the terminal 3, and moreover the plugin of the seventh modification is added to the browser of the terminal 3. In this case, a process of the middleware and a process of the plugin according to the eighth modification are similar to the process of the middleware according to the sixth modification and the process of the plugin according to the seventh modification respectively.

However, like the above second modification, the problem of the contention occurs, and therefore the contention is avoided by the same means as the above second modification.

As the above result, the eighth modification has the advantage similar to the above sixth modification.

By the way, as described above, in accordance with the present embodiment and the first to eighth modifications thereof, the identification information (the pen ID, the user ID, the terminal ID, or the identification information of the software (the middleware or the plugin) installed on the terminal 3) of the client (collectively referring to the barcode reader 1, the user, the terminal 3, and the software installed on the terminal 3) is utilized for the selection of the function (e.g., the CGI 9-*m* installed on the host computer 7, or the other server, or the CGI 9-*m* installed thereon), and therefore it is possible to send the barcode 13 read by the barcode reader 1 and/or the result of decoding the barcode 13 to the appropriate function. As the result, the appropriate function corresponding to the client is invoked, and therefore the function can perform information processing depending on the received barcode 13 and/or the received result of decoding the barcode 13.

Meanwhile, the present invention is not limited to the above embodiment, and a variety of variations may be effected without departing from the spirit and scope thereof, as described in the following modification examples.

(1) The terminal ID is utilized in the above third, to fifth modifications, and the user ID is utilized in the above sixth to eighth modifications. However, in these modifications, the CGI 9-*m* may be selected by utilizing the terminal ID and the user ID, the terminal ID and the pen ID, the user ID and the pen ID, or the terminal ID, the user ID, and the pen ID. In the case where the terminal ID and the user ID are utilized, the database 11 relates the CGISs 9-*m* to the terminal IDs and the user IDs. In the case where the terminal ID and the pen ID are utilized, the database 11 relates the CGISs 9-*m* to the terminal IDs and the pen IDs. In the case where the user ID and the pen ID are utilized, the database 11 relates the CGISs 9-*m* to the user IDs and the pen IDs. In the case where the terminal ID, the user ID, and the pen ID are utilized, the database 11 relates the CGISs 9-*m* to the terminal IDs, the user IDs, and the pen IDs.

(2) In the above embodiment, the barcode reader 1 may have only the first mode, and the driver and the middleware may not be installed. Also, in the above embodiment and the first to eighth modifications, the barcode reader 1 may have only the second mode. In this case, the barcode reader 1 is not required to store the command 37.

As described above, the host address 35 is transmitted from the barcode reader 1 to the terminal 3. However, the terminal 3 may have the host address 35 preliminarily, or the user may input it. In this case, the barcode reader 1 is not required to store the host address 35. Also, in the above third to eighth modifications, the pen ID is optional. Accordingly, in the case where the pen ID is not utilized, the barcode reader 1 is not required to store the pen ID.

In the above third to eighth modifications, in the case where the barcode reader 1 has only the second mode, further the terminal 3 has the host address 35 preliminarily, and moreover the pen ID is not utilized, the dedicated barcode reader 1 for the present system is not required (of course, may be utilized), and therefore a general universal barcode reader can be employed. For example, a barcode reader, which is designed and produced for a general POS (Point Of Sale) system without being designed and produced specifically for the present system, may be employed.

(3) As described above, the driver and/or middleware control the browser, and thereby the barcode 13 and so on is transmitted to the host computer 7. However, in addition to the functions of the above driver and/or middleware, dedicated software with a communication function may be installed on the terminal 3, and thereby the process can be performed without involving the browser.

(4) In the case of the above examples, while the barcode 13 is employed as the information to be transmitted to the host computer 7 and the CGI 9-*m*, the present invention is not limited thereto. For example, an electronic tag (IC tag) such as RFID (Radio Frequency Identification System) can be used. However, in this case, the information encoded in the electronic tag (code) is read by an electronic tag reader (IC tag reader) in place of the barcode reader 1. The electronic tag reader implements the function of any one of the above embodiment and the above first to eighth modifications except the barcode scanning. In this case, identification information of the electronic tag reader is utilized in place of the pen ID.

Also, while a one-dimensional barcode which is a one-dimensional code is used in the above examples, it is possible to use a two-dimensional barcode or QR code as a two-dimensional code. Also, a code, which is represented with a dot pattern which is hardly visible to a human, may be employed as a two-dimensional code.

(5) It is also possible to use the barcode recognition feature implemented with the camera of a cellular phone in place of the barcode reader 1. This is true in the case of the recognition of QR codes. In this case, the functions of the terminal 3 and the barcode reader 1 of any one of the above embodiment and the first to eighth modification are implemented in the cellular phone. Also, in this case, identification information of the cellular phone is utilized in place of the pen ID.

(6) As described above, the host computer 7 transfers either the barcode 13 or the result of decoding the barcode 13 to the CGI 9-*m*. However, both of the barcode 13 and the result of decoding the barcode 13 may be transferred. Also, the host computer 7 may transfer the pen ID, the terminal ID, or the user ID, or a combination of two or more thereof together with the barcode 13, the result of decoding the barcode 13, or the barcode 13 and the result of decoding the barcode 13 to the CGI 9-*m*.

(7) As described above, the host computer 7 selects the CGI 9-*m* on the basis of the pen ID, the terminal ID, or the user ID, or the combination of two or more thereof. However, the host computer 7 may select the CGI 9-*m* on the basis of the barcode 13 without utilizing them, and transfer the barcode 13 and/or the result of decoding the barcode 13 (step S39 of FIG. 7) to the selected CGI 9-*m*.

In this way, the barcode 13 read by the barcode reader 1 is utilized for the selection of the function (e.g., the CGI 9-*m* installed on the host computer 7, or the other server, or the CGI 9-*m* installed thereon), and therefore it is possible to send the barcode 13 and/or the result of decoding the barcode 13 to the appropriate function. As the result, the appropriate function corresponding to the barcode 13 is invoked, and therefore the function can perform information processing depending on the received barcode 13 and/or the received result of decoding the barcode 13.

Incidentally, the host computer 7 may select the CGI 9-*m* on the basis of the pen ID, the terminal ID, the user ID, or the barcode 13, or a combination of two or more thereof. Also, the host computer 7 may decode the pen ID, the terminal ID, the user ID, or the barcode 13, or a combination of two or more thereof in step S39 of FIG. 7, and transmit the result to the CGI 9-*m*.

(8) The CGI is just an example of a function for providing a client with dynamic service, but the present invention is not limited thereto. For example, it may be ASP (Active Server Pages).

(9) As physically viewed, the host computer 7 can be implemented with a single computer. Alternatively, the processes of the host computer 7 can be performed by a plurality of computers as distributed processing. Of course, in the case where distributed processing is employed, the respective computers may be located in the same country, or distributed in a plurality of countries. Meanwhile, the host computer 7 as referred to herein are devices which are implemented by means of hardware and/or software. The are true in the case of the server.

(10) In the present specification and claims, the term "unit" does not always refer to a physical device but can also refer to software for implementing the functions of this unit. Furthermore, the functions of one unit may be implemented by two or more physical devices. Conversely, the functions of two or, more units may be implemented by one physical device. This is true in the case of the server and the computer.

For example, the present invention is available to fields in which a barcode, a QR code, a code stored in an IC tag, a code represented with a dot pattern, or the like is collected through a network, and processed.

While the present invention has been described in detail in terms of embodiments, it is apparent that those skilled in the art will recognize that the invention is not limited to the embodiments as explained in this application. The present invention can be practiced with modification and alteration within the spirit and scope of the present invention as defined by the appended any one of claims. The description is thus to be regarded as illustrative instead of limiting in any way on the present invention.

What is claimed is:

1. A remote code reader system comprising:

a code reader operable to read a code; and a server configured to connect to a network, wherein identification information assigned specific to a client including said code reader, and the code read by said code reader are transmitted to said server through a terminal connected to the network, and wherein said server including:

a first decoding unit operable to decode the received identification information and the received code in accordance with a first predetermined algorithm to select a function which conforms to the identification information and the code;

a second decoding unit operable to decode the received code in accordance with a second predetermined algorithm; and a giving unit operable to give at least a result of decoding by said second decoding unit among the code, the identification information, and the result of decoding to the function as selected in order to make the function process.

2. A remote code reader system comprising:

a code reader operable to read a code; and a server configured to connect to a network, wherein identification information assigned specific to a client including said code reader, and the code read by said code reader are transmitted to said server through a terminal connected to the network, and wherein said server including:

a first decoding unit operable to decode the received identification information in accordance with a first predetermined algorithm to select a function which conforms to the identification information;

a second decoding unit operable to decode the received identification information and the received code in accordance with a second predetermined algorithm; and a giving unit operable to give at least a result of decoding by said second decoding unit among the code, the identification information, and the result of decoding to the function as selected in order to make the function process.

3. The remote code reader system as claimed in claim 1, wherein said second decoding unit decodes the identification information and the code in accordance with the second predetermined algorithm.

4. The remote code reader system as claimed in claim 1, wherein the identification information of the client is identification information of said code reader, identification information of the terminal, identification information of a user, or identification information of software installed on the terminal, or a combination of two or more thereof.

5. The remote code reader system as claimed in claim 2, wherein the identification information of the client is identification information of said code reader, identification information of the terminal, identification information of a user, or identification information of software installed on the terminal, or a combination of two or more thereof.

6. A remote code reader system comprising:

a code reader operable to read a code; and a server configured to connect to a network, wherein the code read by said code reader is transmitted to said server through a terminal connected to the network, and wherein said server including:

a first decoding unit operable to decode the code in accordance with a first predetermined algorithm to select a function which conforms to the code;

a second decoding unit operable to decode the code in accordance with a second predetermined algorithm; and a giving unit operable to give at least a result of decoding by said second decoding unit of the code and the result of decoding to the function as selected in order to make the function process.

7. The remote code reader system as claimed in claim 1, wherein the function is a function for providing with service dynamically.

8. The remote code reader system as claimed in claim 2, wherein the function is a function for providing with service dynamically.

9. The remote code reader system as claimed in claim 6, wherein the function is a function for providing with service dynamically.

10. The remote code reader system as claimed in claim 1, wherein the code is a one-dimensional code, a two-dimensional code, or a code stored in an IC tag.

11. The remote code reader system as claimed in claim 10, wherein the one-dimensional code is a one-dimensional barcode, the two-dimensional code is a QR code or a code represented with a dot pattern, or the IC tag is an RFID tag.

12. The remote code reader system as claimed in claim 2, wherein the code is a one-dimensional code, a two-dimensional code, or a code stored in an IC tag.

13. The remote code reader system as claimed in claim 12, wherein the one-dimensional code is a one-dimensional barcode, the two-dimensional code is a QR code or a code represented with a dot pattern, or the IC tag is an RFID tag.

14. The remote code reader system as claimed in claim 6, wherein the code is a one-dimensional code, a two-dimensional code, or a code stored in an IC tag.

15. The remote code reader system as claimed in claim 14, wherein the one-dimensional code is a one-dimensional barcode, the two-dimensional code is a QR code or a code represented with a dot pattern, or the IC tag is an RFID tag.

16. A server, comprising:

a receiver configured to receive, through a network, identification information assigned specific to a client including a code reader, and a code read by the code reader;

a first decoding unit operable to decode the received identification information and the received code in accordance with a first predetermined algorithm to select a function which conforms to the identification information and the code;

a second decoding unit operable to decode the received code in accordance with a second predetermined algorithm; and a giving unit operable to give at least a result of decoding by the second decoding unit among the code, the identification information, and the result of decoding, to the function as selected in order to make the function process.

17. A server, comprising:

a receiver configured to receive, through a network, identification information assigned specific to a client including a code reader, and a code read by the code reader;

a first decoding unit operable to decode the received identification information in accordance with a first predetermined algorithm to select a function which conforms to the identification information;

a second decoding unit operable to decode the received identification information and the received code in accordance with a second predetermined algorithm; and a giving unit operable to give at least a result of decoding by the second decoding unit among the code, the identification information, and the result of decoding, to the function as selected in order to make the function process.

18. A server, comprising:

a receiver configured to receive, through a network, a code read by a code reader;

a first decoding unit operable to decode the received code in accordance with a first predetermined algorithm to select a function which conforms to the code;

a second decoding unit operable to decode the received code in accordance with a second predetermined algorithm; and a giving unit operable to give at least a result of decoding by the second decoding unit of the code and the result of decoding, to the function as selected in order to make the function process.

19. A method capable of being performed by a computer, comprising the steps of:

receiving, through a network, identification information assigned specific to a client including a code reader, and a code read by the code reader;

decoding the received identification information and the received code in accordance with a first predetermined algorithm to select a function which conforms to the identification information and the code;

decoding the received code in accordance with a second predetermined algorithm; and giving at least a result of decoding by the second predetermined algorithm among the code, the identification information, and the result of decoding, to the function as selected in order to make the function process.

20. A method capable of being performed by a computer, comprising the steps of:

receiving, through a network, identification information assigned specific to a client including a code reader, and a code read by the code reader;

decoding the received identification information in accordance with a first predetermined algorithm to select a function which conforms to the identification information;

decoding the received identification information and the received code in accordance with a second predetermined algorithm; and giving at least a result of decoding by the second predetermined algorithm among the code, the identification information, and the result of decoding, to the function as selected in order to make the function process.

21. A method capable of being performed by a computer, comprising the steps of:

receiving, through a network, a code read by a code reader;

decoding the received code in accordance with a first predetermined algorithm to select a function which conforms to the code;

decoding the received code in accordance with a second predetermined algorithm; and giving at least a result of decoding by the second predetermined algorithm of the code and the result of decoding ,to the function as selected in order to make the function process.

22. A non-transitory computer readable medium having stored thereon a computer program configured to cause a computer to execute the steps of:

receiving, through a network, identification information assigned specific to a client including a code reader, and a code read by the code reader;

decoding the received identification information and the received code in accordance with a first predetermined algorithm to select a function which conforms to the identification information and the code;

decoding the received code in accordance with a second predetermined algorithm; and giving at least a result of decoding by the second predetermined algorithm among the code, the identification information, and the result of decoding, to the function as selected in order to make the function process.

23. A non-transitory computer readable medium having stored thereon a computer program configured to cause a computer to execute the steps of:

receiving, through a network, identification information assigned specific to a client including a code reader, and a code read by the code reader;

decoding the received identification information in accordance with a first predetermined algorithm to select a function which conforms to the identification information;

decoding the received identification information and the received code in accordance with a second predetermined algorithm; and giving at least a result of decoding by the second predetermined algorithm among the code, the identification information, and the result of decoding, to the function as selected in order to make the function process.

24. A non-transitory computer readable medium having stored thereon a computer program configured to cause a computer to execute the steps of:

receiving, through a network, a code read by a code reader;

decoding the received code in accordance with a first predetermined algorithm to select a function which conforms to the code;

decoding the received code in accordance with a second predetermined algorithm; and giving at least a result of decoding by the second predetermined algorithm of the code and the result of decoding, to the function as selected in order to make the function process.

* * * * *